US012682833B2

(12) United States Patent
Wu et al.

(10) Patent No.: US 12,682,833 B2
(45) Date of Patent: Jul. 14, 2026

(54) PIXEL UNIT HAVING A PLURALITY OF GREEN LED ELEMENTS AND DISPLAY MODULE

(71) Applicant: Lextar Electronics Corporation, Hsinchu City (TW)

(72) Inventors: Jui-Yi Wu, Hsinchu City (TW); Cheng-Yen Tsai, Hsinchu City (TW); Kai-Hsiang Shih, Hsinchu City (TW); Chih-Hao Lin, Hsinchu City (TW); Chien-Nan Yeh, Hsinchu City (TW)

(73) Assignee: Lextar Electronics Corporation, Hsinchu City (TW)

( * ) Notice: Subject to any disclaimer, the term of this patent is extended or adjusted under 35 U.S.C. 154(b) by 0 days.

(21) Appl. No.: 18/919,728

(22) Filed: Oct. 18, 2024

(65) Prior Publication Data

US 2025/0131872 A1 Apr. 24, 2025

(30) Foreign Application Priority Data

Oct. 18, 2023 (TW) ................................ 112139735

(51) Int. Cl.
*G09G 3/32* (2016.01)

(52) U.S. Cl.
CPC ....... *G09G 3/32* (2013.01); *G09G 2300/0452* (2013.01); *G09G 2320/0233* (2013.01); *G09G 2320/0666* (2013.01)

(58) Field of Classification Search
CPC ........................................................ G09G 3/32
USPC ........................................................... 345/55
See application file for complete search history.

(56) References Cited

U.S. PATENT DOCUMENTS

| | | | | |
|---|---|---|---|---|
| 2017/0221979 A1* | 8/2017 | Chae | .................... | H10K 59/126 |
| 2020/0211449 A1* | 7/2020 | Kim | ..................... | G09G 3/3233 |
| 2020/0365085 A1* | 11/2020 | Yang | .................... | G09G 3/3275 |
| 2021/0098526 A1* | 4/2021 | Cho | .................... | H01L 25/0753 |
| 2021/0134892 A1* | 5/2021 | Hwang | ................ | G09G 3/2003 |

FOREIGN PATENT DOCUMENTS

| | | |
|---|---|---|
| CN | 116741106 A | 9/2023 |
| TW | 202228112 A | 7/2022 |

* cited by examiner

*Primary Examiner* — Long D Pham

(74) *Attorney, Agent, or Firm* — Patterson + Sheridan, LLP

(57) ABSTRACT

In order to maintain the white balance ratio of the mixed white light, a pixel unit is provided, which is composed of four sub-pixels of red, green, blue, and another green colors, and these sub-pixels are composed of a red LED element, a first green LED element, a blue LED element and a second green LED element. A control element is used to control the four sub-pixels of red, first green, blue and second green correspondingly by outputting control signals through the control channels. Base on the adjustment of the current, the brightness ratio of the above three colors is still maintained at the ratio of 3:6:1 of the white balance, and the ratio of the white balance of the white light after being mixed is also maintained.

8 Claims, 7 Drawing Sheets

PIXEL UNIT HAVING A PLURALITY OF GREEN LED ELEMENTS AND DISPLAY MODULE

CROSS REFERENCE TO RELATED APPLICATIONS

This Application claims priority of Taiwan Patent Application No. 112139735, filed on Oct. 18, 2023, the entirety of which is incorporated by reference herein.

BACKGROUND OF THE DISCLOSURE

Field of the Disclosure

This disclosure relates to a composition of a pixel unit. In particularly, the composition can enhance the resolution of a display module.

Description of the Related Art

Since the development of display devices, it has evolved from black and white to colorful screens, from text display to ultra-high-resolution images, from low brightness to high dynamic brightness adjustment, from flat to flexible shapes, and even evolved to transparent display devices. Thus, display technology pursues higher technical level to adapt to different application fields continuously. The display technology is mainly driven by light-emitting diode (LED) which can meet the requirements of display such as wide color gamut, high density, high brightness, and low power consumption by its unique element characteristics.

Furthermore, with breakthroughs in key technologies such as light-emitting efficiency, mass transfer, and chip repair, the direct LED backlight display's mass production technology has also matured. Therefore, the requirements for display image quality have been enhanced.

In display screens, the sub-pixels are commonly used to mix red, green, and blue (hereinafter referred to as RGB) to form white light to display color information of a single pixel. As sizes of the sub-pixels become smaller, the difficulty of mass production is increased because of the requirement for process precision. In particular, with the recent development of micro light-emitting diode (micro LED) display panels, each sub-pixel can be driven to emit light individually since they use micro LEDs as sub-pixels in the display panels. In high-resolution or large-size micro LED display panels, there may be issues of reduced light-emitting efficiency or wavelength shift caused by the current supply differences of each control line. As a result, problems including inconsistency in brightness or color imaging performance of the micro LED display panels may occur.

BRIEF SUMMARY OF THE DISCLOSURE

The purpose of this application is providing a design that can achieve high-resolution LED display to solve the aforementioned problems.

This application discloses a pixel unit (100), including: four sub-pixels (11, 12, 13, 14), the sub-pixels include at least one red LED element (R1), two green LED elements (G1, G2), and one blue LED element (B1); a control element (2) outputting control signals (CR1, CG1, CB1) to the red LED element, green LED elements, and blue LED element through a control channel (3), respectively.

This application discloses a display module (200, 300), including: multiple aforementioned pixel units (100). When the pixel unit has N green LED elements, and N=4 or 6, they can form a square array in pairs.

To make the features and advantages of this application more understandable, embodiments will be given in the following detailed description when read with the accompanying figures.

DETAILED DESCRIPTION OF THE DISCLOSURE

Exemplary embodiments of the present disclosure are described in detail with FIG. 1A to FIG. 5B to allow people with skilled in the art to fully understand the spirit of the present disclosure. The present disclosure is not limited to the following embodiments, but it may be implemented in other forms. In the specification, some identical symbols indicate elements with the same or similar structure, function, or principle, and those skilled in the art may infer this based on the teachings of this specification. Elements with the same symbols will not be described again for simplicity.

Figure 1B:
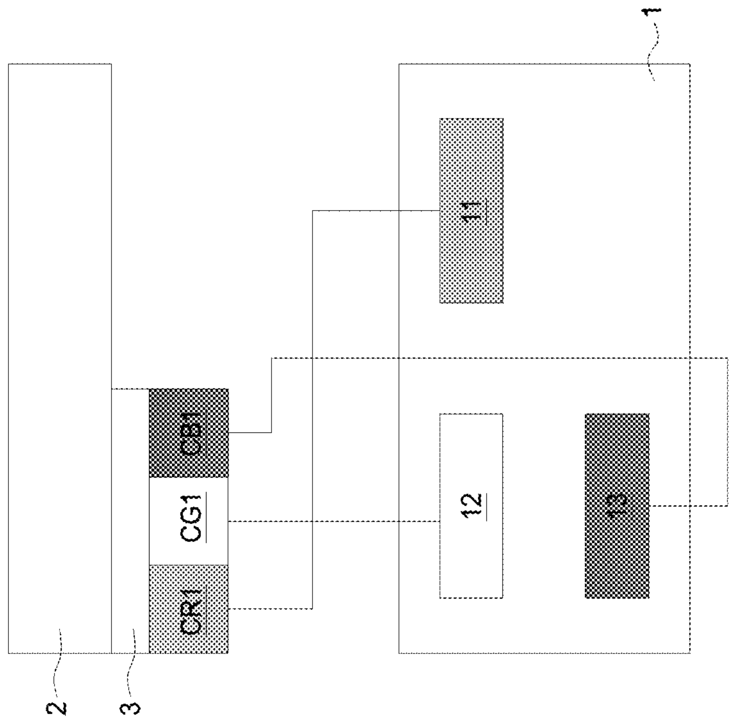
FIG. 1B Prior Art
FIG. 1B is a schematic view of a conventional control method.
Figure 1A:
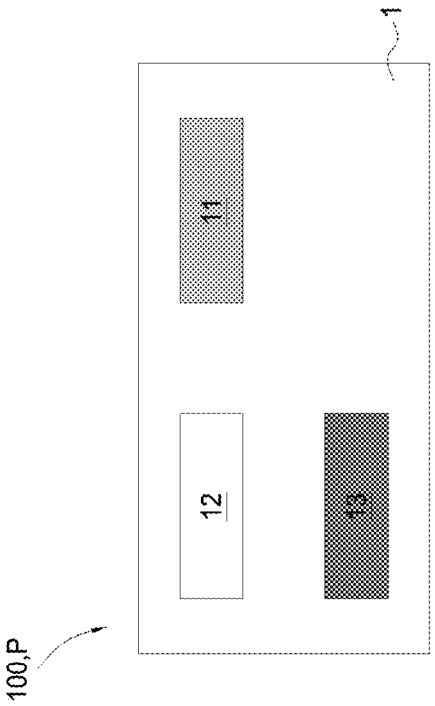
FIG. 1A Prior Art
FIG. 1A is a schematic view of a conventional pixel assembly.

FIG. 1A to FIG. 1B show a conventional pixel composition of display modules currently used in the industry. Referring to FIG. 1A, the pixel units (100, P) of the conventional display module include three sub-pixels whose colors are red (11), green (12), and blue (13). These sub-pixels are composed of a red LED element, a green LED element, and a blue LED element. The red LED element becomes red sub-pixel (11) when it is turned on, the first green LED element becomes green sub-pixel (12) when it is turned on, and the blue LED element becomes blue sub-pixel (13) when it is turned on. FIG. 1B further discloses a control element (2) used to generate control signals and output three control signals (CR1, CG1, CB1) through a control channel (3) to correspondingly control the red (11), green (12), and blue (13) sub-pixels. The white light is generated by mixing the lights simultaneously illuminated by the sub-pixels. The aforementioned operation method is an ordinary operation.

Figure 2B:
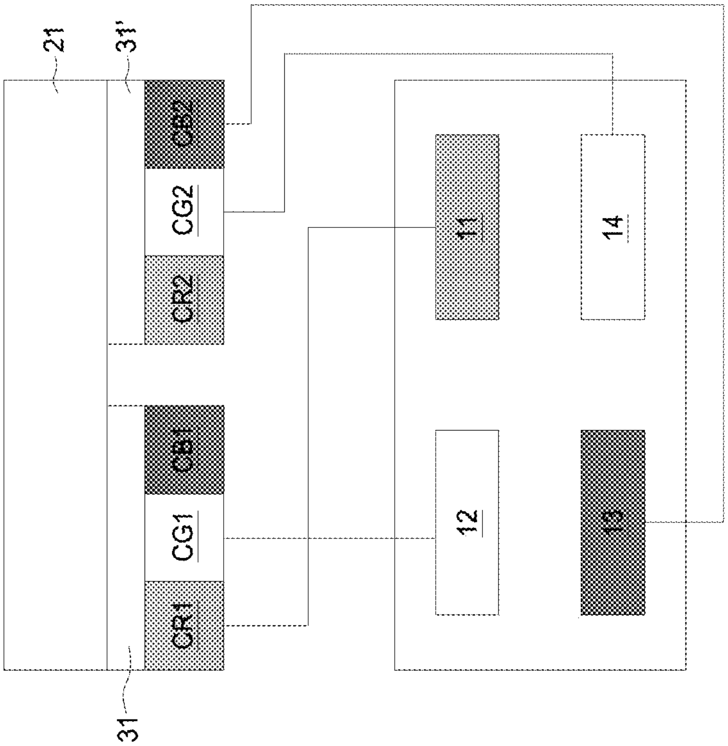
FIG. 2B Prior Art
FIG. 2B to FIG. 2D are schematic views of another conventional pixel unit control method.
Figure 2A:
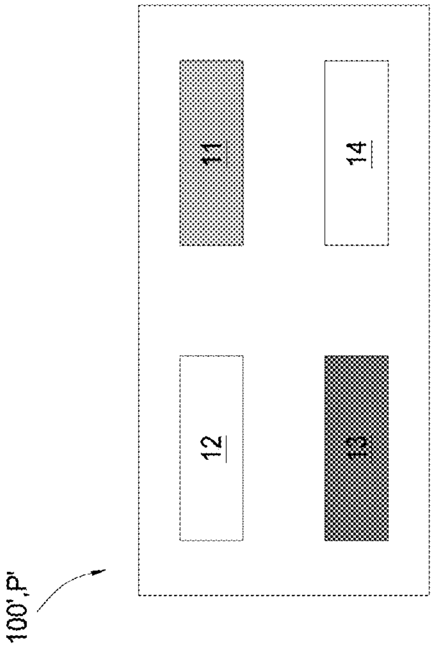
FIG. 2A Prior Art
FIG. 2A is a schematic view of another conventional pixel assembly.

Referring to FIG. 2A, a second green LED element for green sub-pixel (14) is added to the pixel unit (100', P') to enhance the color saturation. The pixel unit (100', P') of the display module is formed by four sub-pixels of red (11), first green (12), blue (13), and second green (14). Referring to FIG. 2B, a control element (21) can correspondingly control the red (11), first green (12), blue (13), and second green (14)

sub-pixels by two sets of control signals (CR1, CG1, CB1; CR2, CG2, CB2) outputted through two control channels (31, 31'). The white light is generated by mixing the lights simultaneously illuminated by the sub-pixels. Although the above operation is an ordinary circuit design, the actual control signals on the control channel (31) are the control signals CR1 and CG1 for controlling the red (11) and first green (12) sub-pixels, and the actual control signals on the control channel (31') are the control signals CB2 and CG2 for correspondingly controlling the blue (13) and second green (14) sub-pixels. Each of the two control channels (31, 31') has one control signal like CB1 or CR2 that is not used.

Figure 2D:
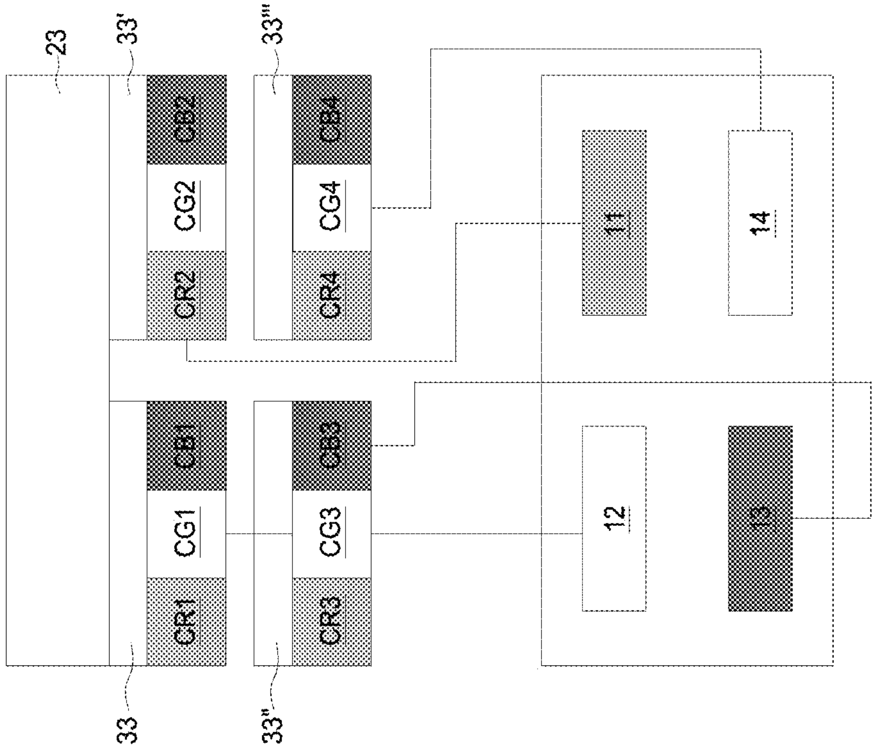
FIG. 2D Prior Art
Figure 2C:
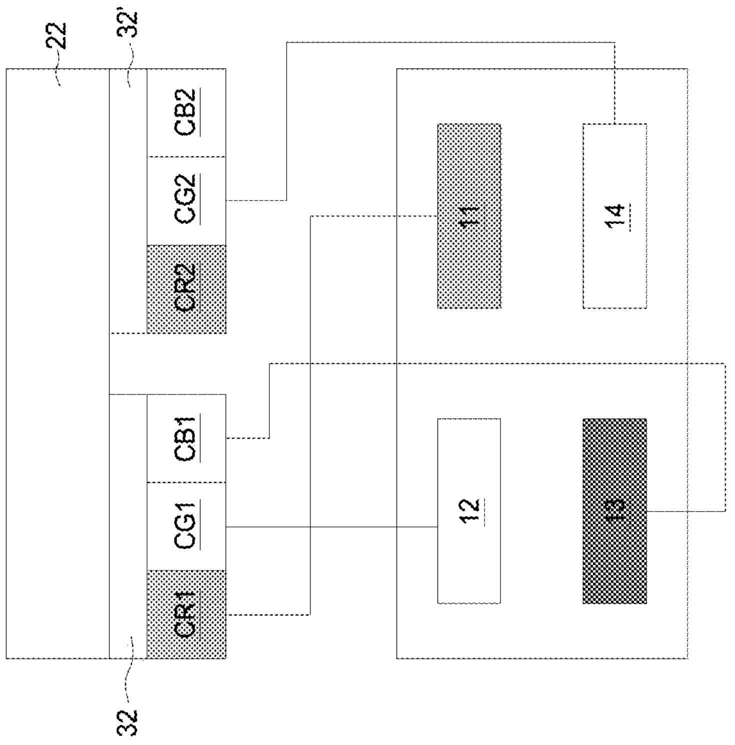
FIG. 2C Prior Art

Referring to FIG. 2C, a control element (22) can correspondingly control the red (11), first green (12), blue (13), and second green (14) sub-pixels by two sets of control signals (CR1, CG1, CB1; CR2, CG2, CB2) outputted through two control channels (32, 32'). The white light is generated by mixing the lights simultaneously illuminated by the sub-pixels. Although the above operation is also an ordinary circuit design, the actual control signals on the control channel (32) are the control signals CR1, CG1, and CB1 for correspondingly controlling the red (11), first green (12), and blue (13) sub-pixels, and the actual control signal on the control channel (32') is the control signal CG2 for controlling the second green (14) pixel. There are two control signals like CR2 and CB2 on the control channel (32') that are not used.

Referring to FIG. 2D, a control element (23) can correspondingly control the red (11), first green (12), blue (13), and second green (14) sub-pixels by four sets of control signals (CR1, CG1, CB1; CR2, CG2, CB2; CR3, CG3, CB3; CR4, CG4, CB4) outputted through four control channels (33, 33', 33", 33'"). White light is generated by mixing the lights simultaneously illuminated by the sub-pixels. Although the above operation is also an ordinary circuit design, the actual control signal on the control channel (33) is the control signal (CG1) for controlling the first green (12) sub-pixel, the actual control signal on the control channel (33') is the control signal (CR2) for controlling the red (11) sub-pixel, the actual control signal on the control channel (33") is the control signal (CB3) for controlling the blue (13) sub-pixel, and the actual control signal on the control channel (33") is the control signal (CG4) for controlling the second green (14) sub-pixel. There are eight control signals of CR1, CB1, CG2, CB2, CB3, CG3, CR4, CB4 in the control channels (33, 33', 33", 33'") that are not utilized.

To solve the shortcoming of the aforementioned circuit which cannot fully utilize the control signals, this application proposes a white light design that can use control signals fully and maintain the ratio of the white balance of the white light.

Figure 3A:
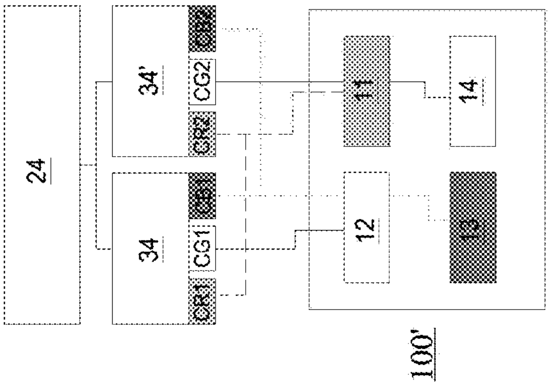
FIG. 3A to FIG. 3D are schematic views of a pixel unit control according to some embodiments of the present disclosure.

Referring to FIG. 3A, to maintain the ratio of the white balance of the white light after being mixed, a pixel unit (100') is formed by four sub-pixels: red (11), first green (12), blue (13), and second green (14) in an embodiment. These sub-pixels are formed by a red LED element, a first green LED element, a blue LED element, and a second green LED element. A control element (24) is used for outputting control signals (CR1, CG1, CB1) and control signals (CR2, CG2, CB2) through control channels (34, 34') to correspondingly control the red (11), first green (12), blue (13), and second green (14) sub-pixels, respectively.

In an embodiment of the present application, the number of control channels (34, 34') in the control element (24) is equal to the number of the green LED elements (G1, G2). The control signal (CG1) outputted through the control channel (34) is connected to the first green sub-pixel (12), and the control signal (CG2) outputted through the control channel (34') is connected to the second green sub-pixel (14) to allow one control channel independently connect to one green LED element on a one-to-one basis. The control signal (CR1) outputted through the control channel (34) and the control signal (CR2) outputted through the control channel (34') are connected to the red sub-pixel (11), and the control signal (CB1) outputted through the control channel (34) and the control signal (CB2) outputted through the control channel (34') are connected to the blue sub-pixel (13). Although the number ratio of red, green, and blue sub-pixels is 1:2:1, the brightness ratio of the three colors is 6:12:2 through the parallel connection of the current. This maintains the brightness ratio of the three colors at 3:6:1 under white balance to maintain the ratio of the white balance of the white light after being mixed.

The control signals in the present application may be current, voltage, circuit driving, and computational logic. The following description of the control signal adjustment will use current as an example. To achieve the white balance of the image and to use control signals fully, it is necessary to increase the current to the red and blue LED elements by adjusting circuit, and the control signals of the red LED element and the blue LED element should be increased to maintain the white balance ratio of the image.

In an embodiment of the present application, when a current is provided, the green LED elements (G1, G2) independently receive a certain current of the control signals, and the red LED element (R1) and the blue LED element (B1) receive the current provided by the doubled control signals to make the brightness ratio of red, green, and blue being 6:12:2, which equal the ratio of image white balance is 3:6:1. Therefore, in some embodiments of the present application, the brightness of the red and blue LED elements each is increased by adjusting the current intensity of the red and blue LED elements, so the white balance ratio is maintained.

Figure 3B:
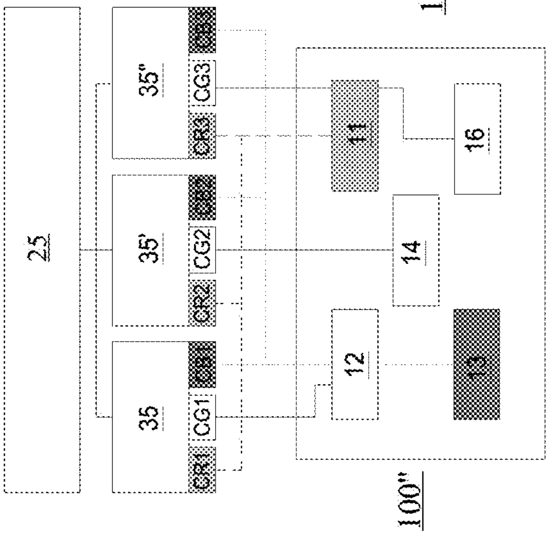

In another embodiment, as shown in FIG. 3B, a pixel unit (100") has three green LED elements (G1, G2, G3), a blue LED element (B1), a red LED element (R1), and a control element (25). The control element (25) has three control channels (35, 35', 35"), which is equal to the number of green LED elements in the embodiment, and each green LED element corresponds to one control channel on the one-to-one basis. The control signal (CG1) outputted through the control channel (35) is connected to the corresponding first green sub-pixel (12), the control signal (CG2) outputted through the control channel (35') is connected to the corresponding second green sub-pixel (14), and the control signal (CG3) outputted through the control channel (35") is connected to the corresponding green sub-pixel (16).

Additionally, the three control channels are all connected to the red LED element (R1). The control signal (CR1) outputted through the control channel (35), the control signal (CR2) outputted through the control channel (35'), and the control signal (CR3) outputted through the control channel (35") are connected to the red sub-pixel (11). Furthermore, the three control channels are all connected to the blue LED element (B1). The control signal (CB1) outputted through the control channel (35), the control signal (CB2) outputted through the control channel (35'), and the control signal (CB3) outputted through the control channel (35") are connected to the blue sub-pixel (13). Although the number ratio of red, green, and blue sub-pixels is 1:3:1, the brightness ratio of the three colors is 9:18:3 through the parallel connection of the current, which is maintained at a 3:6:1 ratio under white balance. This maintains the ratio of the white balance of the white light after being mixed.

Figure 3C:
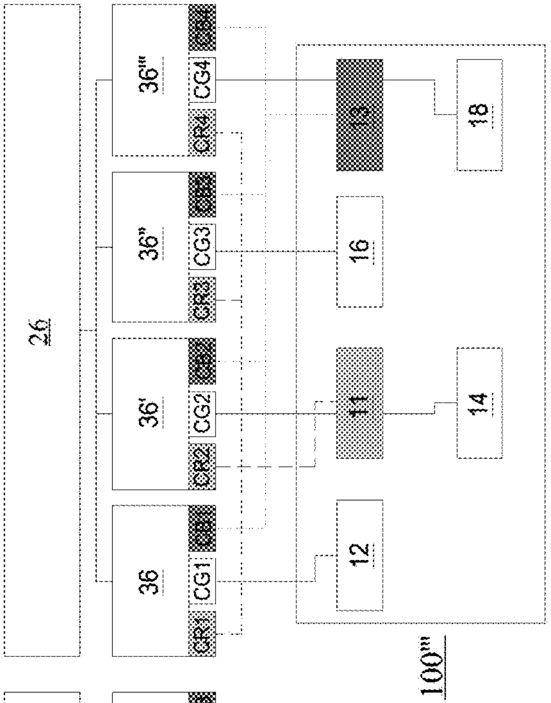

In another embodiment, as shown in FIG. 3C, a pixel unit (100''') includes four green LED elements (G1, G2, G3, G4), a blue LED element (B1), a red LED element (R1), and a control element (26). The control element (26) has four control channels (36, 36', 36'', 36'''), which is equal to the number of green LED elements in the embodiment, and each green LED element corresponds to one control signal on the one-to-one basis. The control signal (CG1) outputted through the control channel (36) is connected to the first green sub-pixel (12), the control signal (CG2) outputted through the control channel (36') is connected to the second green sub-pixel (14), the control signal (CG3) outputted through the control channel (36'') is connected to the third green sub-pixel (16), and the control signal (CG4) outputted through the control channel (36''') is connected to the fourth green sub-pixel (18). Additionally, the control signals for red (CR1, CR2, CR3, CR4) of the four control channels are all connected to the red LED element (R1). The control signal (CR1) outputted through the control channel (36), the control signal (CR2) outputted through the control channel (36'), the control signal (CR3) outputted through the control channel (36''), and the control signal (CR4) outputted through the control channel (36''') are connected to the red sub-pixel (11). The control signals for blue (CB1, CB2, CB3, CB4) of four the control channels are all connected to the blue LED element (B1). The control signal (CB1) outputted through the control channel (36), the control signal (CB2) outputted through the control channel (36'), the control signal (CB3) outputted through the control channel (36''), and the control signal (CB4) outputted through the control channel (36'') are connected to the blue sub-pixel (13). Although the number ratio of red, green, and blue sub-pixels is 1:4:1, the brightness ratio of the three colors is 12:24:4 through the parallel connection of the current, which is maintained at a 3:6:1 ratio under white balance. This maintains the ratio of the white balance of the white light after being mixed.

Figure 3D:
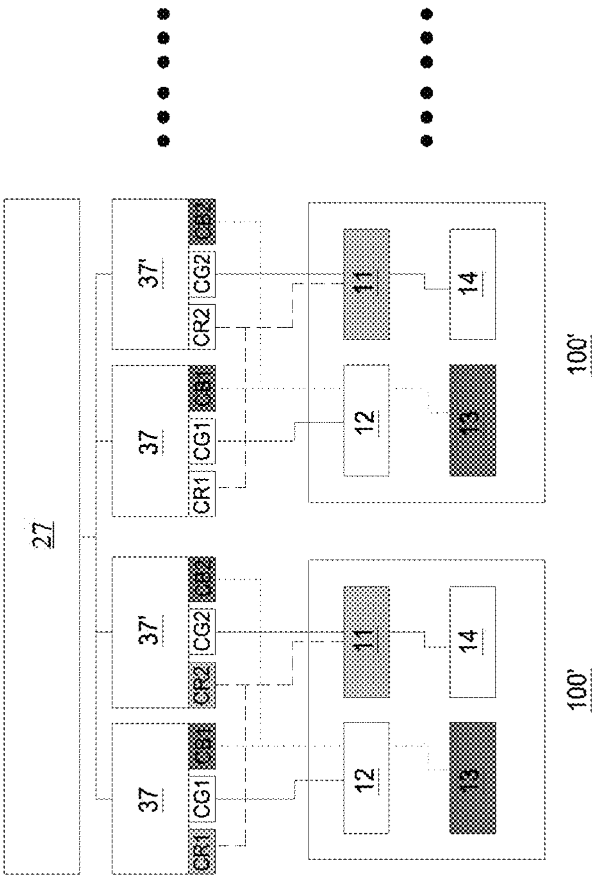

In another embodiment, as shown in FIG. 3D, when there are multiple pixel units (100') and each of them has two green LED elements (G1, G2), a blue LED element (B1), and a red LED element (R1) as described in the embodiment of FIG. 3A, the control element (27) may independently control the multiple pixel units (100'). Each pixel unit (100') still has two control channels (37, 37') that is equal to the number of green LED elements, and each green LED element corresponds to one control channel on the one-to-one basis. the control signal (CG1) outputted through the control channel (37) is connected to the first green sub-pixel (12), and the control signal (CG2) outputted through the control channel (37') is connected to the second green sub-pixel (14). The control signals (CR1, CR2) of the two control channels are all connected to the red LED element (R1). The control signal (CR1) outputted through the control channel (37) and the control signal (CR2) outputted through the control channels (37') are connected to the red sub-pixel (11). The control signals (CB1, CB2) of the two control channels are all connected to the blue LED element (B1). The control signal (CB1) outputted through the control channel (37) and the control signal (CB2) outputted through the control channels (37') are connected to the blue sub-pixel (13). When the control element (27) is able to independently control multiple pixel units (100'), although the number ratio of red, green, and blue sub-pixels in each pixel unit (100') is 1:2:1, the brightness ratio of the three colors is 6:12:2 through the parallel connection of the current, which is maintained at a 3:6:1 ratio under white balance. This maintains the ratio of the white balance of the white light after being mixed.

Furthermore, this application discloses a display module (200, 300). When the display module (200, 300) includes multiple pixel units (100''', 100''''), the pixel units have N green LED elements (G), and N equals to 4 or 6, the pixel units may form a square array (S1, S2) in pairs.

Figure 4B:
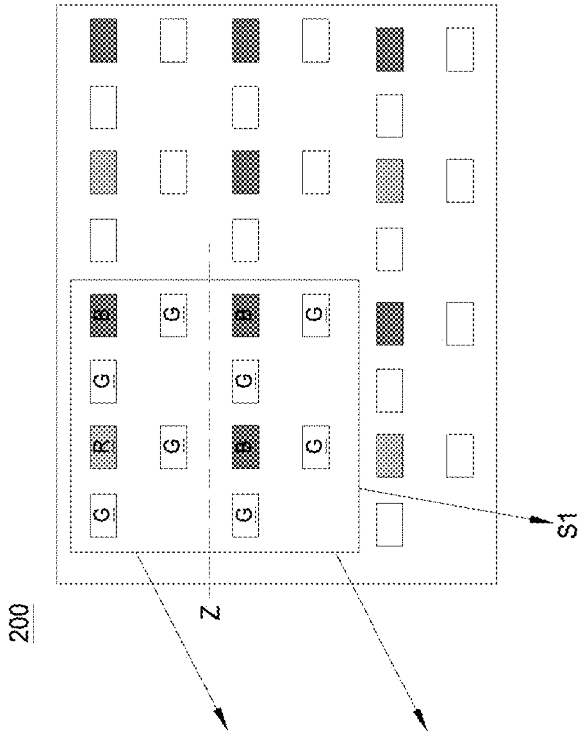
FIG. 4B is a schematic view of the display module according to some embodiments of the present disclosure.
Figure 4A:
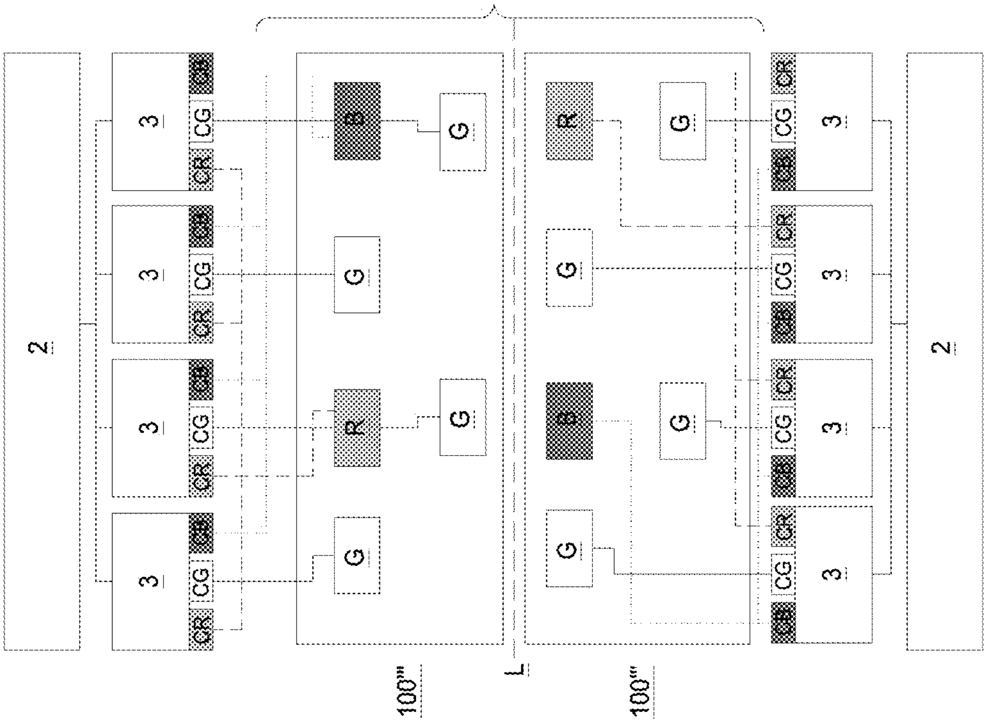
FIG. 4A is a schematic view of another pixel unit control according to some embodiments of the present disclosure.

In the embodiment shown in FIG. 4A and FIG. 4B, the display module (200) disclosed in FIG. 4B is formed by more than one pixel units (100'''). When the pixel unit (100''') has four green LED elements (G), two pixel units (100''') as a group may form a square array (S1). As shown in FIG. 4B, there are two pixel units (100''') over and under a partition line (Z). The control element corresponding to the upper pixel unit (100''') may be the one over a partition line (L) of FIG. 4A, and the control element corresponding to the lower pixel unit (100''') may be the one under the partition line (L) of FIG. 4A. As a result, two pixel units may form a group of a square array of a light-emitting elements, and each of the pixel units are independently controlled by the corresponding control elements.

Figure 5B:
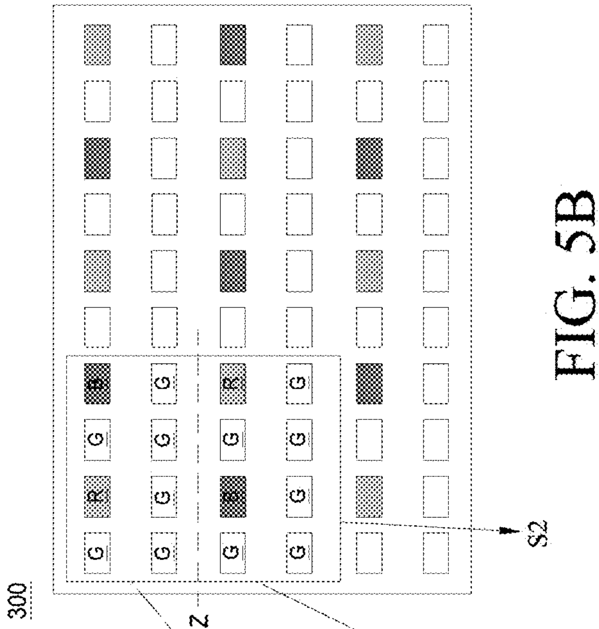
FIG. 5B is a schematic view of the display module according to some embodiment of the present disclosure.
Figure 5A:
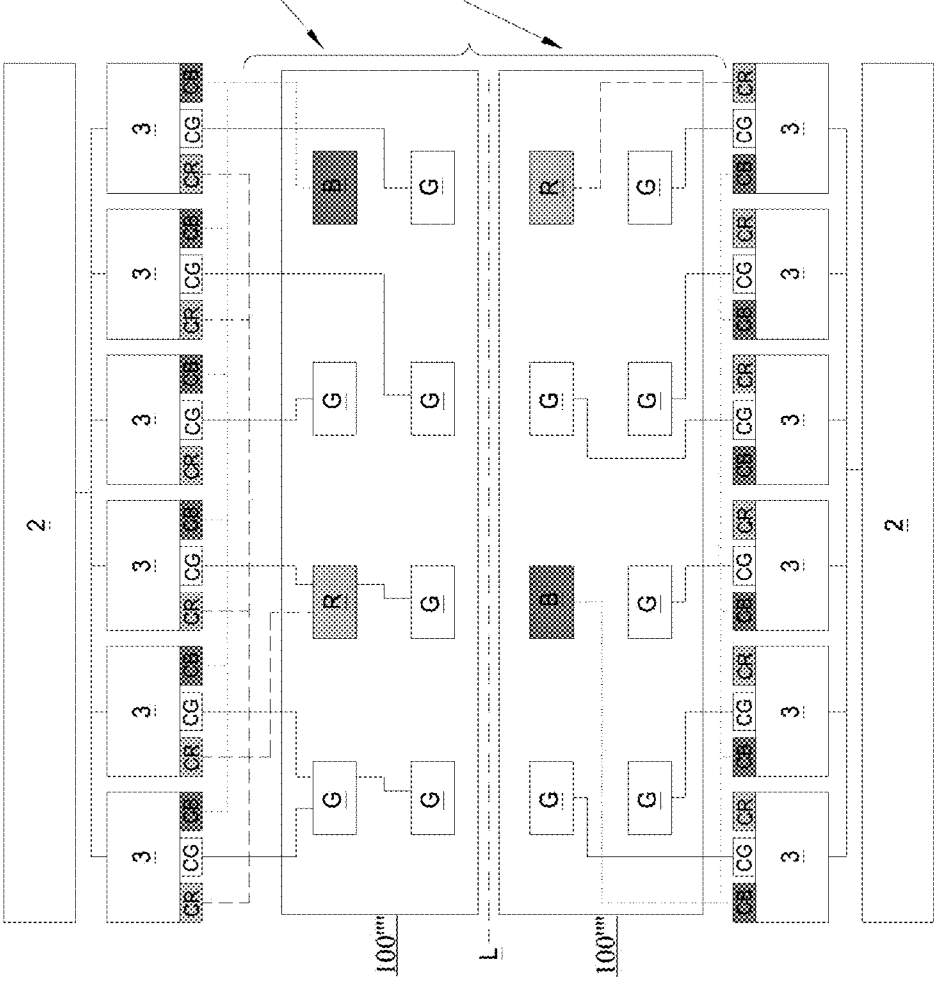
FIG. 5A is a schematic view of another pixel unit control according to some embodiments of the present disclosure.

In the embodiment shown in FIG. 5A and FIG. 5B, the display module (300) disclosed in FIG. 5B is formed by more than one pixel units (100''''). When the pixel unit (100'''') has six green LED elements (G), two pixel units (100'''') may form a square array (S2) as a group. As shown in FIG. 5B, there are two pixel units (100'''') over and under a partition line (Z). The control element corresponding to the upper pixel unit (100'''') may be the one over a partition line (L) of FIG. 5A, and the control element corresponding to the lower pixel unit (100'''') may be the one under the partition line (L) of FIG. 5A. As a result, two pixel units may form a group of a square array of a light-emitting elements, and each of the pixel units are independently controlled by the corresponding control elements.

The aforementioned embodiments are only used for illustrating the principle and functions of the present application. Anyone skilled in the art of the present application can make modifications and changes to the aforementioned embodiments without departing from the technical principles and spirit of the present application. All equivalent changes and modifications based on the shape, structure, characteristics, and spirit described in the claims of the present application should be included within the scope of the claims of the present application.

What is claimed is:

1. A pixel unit composed of a red sub-pixel, a plurality of green sub-pixels, and a blue sub-pixel, comprising:

a plurality of LED elements comprising a red LED element, a plurality of green LED elements, and a blue LED element; and a control element generating control signals through control channels to the red LED element, the plurality of green LED elements, and the blue LED element so the plurality of LED elements are turned to the red sub-pixel, the plurality of green sub-pixels, and the blue sub-pixel respectively;

wherein a number of the plurality of the control channels is identical to a number of the plurality of green LED elements, wherein the control channels include a first control channel and a second control channel, wherein the control signals include a first signal, a second signal, and a third signal, and wherein each of the first channel and the second channel outputs a first signal for controlling the red sub-pixel, a second signal for controlling the blue sub-pixel, and a third signal for controlling the green sub-pixels respectively.

2. The pixel unit as claimed in claim 1, wherein the green sub-pixels includes a first green sub-pixel and a second green sub-pixel, the first green sub-pixel receives the third signal of the first channel, and the second green sub-pixel receives the third signal of the second channel respectively.

3. The pixel unit as claimed in claim 1, wherein the red sub-pixel receives the first signal of the first channel and the first signal of the second channel.

4. The pixel unit as claimed in claim 1, wherein the blue sub-pixel receives the second signal of the first channel and the second signal of the second channel.

5. The pixel unit as claimed in claim 1, wherein a brightness ratio of the red LED element, the plurality of green LED elements, and the blue LED element is 3:6:1.

6. A display module, comprising:

a plurality of pixel units as claimed in claim 1, when each of the pixel units comprises N green LED elements to form a square array in pairs wherein N equals to 4 or 6.

7. The display module as claimed in claim 6, wherein the square array comprises a partition line, and numbers of the LED elements on both sides of the partition line are equal.

8. The display module as claimed in claim 6, wherein a partition line is between the control channels corresponding to the square array, the control channels are divided by the partition line to two groups independently controlled by the corresponding control elements, respectively.

* * * * *